United States Patent [19]

Hirano

[11] Patent Number: 5,542,170
[45] Date of Patent: Aug. 6, 1996

[54] APPARATUS FOR INSERTING INSULATION SHEETS INTO SLOTS OF A STATOR CORE

[75] Inventor: Masatoshi Hirano, Kanagaawa, Japan

[73] Assignee: Odawara Engineering Co., Ltd., Japan

[21] Appl. No.: 357,659

[22] Filed: Dec. 16, 1994

[51] Int. Cl.⁶ .................................................. H02K 15/10
[52] U.S. Cl. ............................................. 29/734; 29/596
[58] Field of Search ............................ 29/734, 736, 596, 29/606

[56] References Cited

U.S. PATENT DOCUMENTS

| | | | |
|---|---|---|---|
| 4,829,649 | 5/1989 | Tribot | 29/734 X |
| 4,831,716 | 5/1989 | Luciani et al. | 29/596 |
| 4,854,033 | 8/1989 | Luciani et al. | 29/596 |

FOREIGN PATENT DOCUMENTS 59-39982  9/1984  Japan.

*Primary Examiner*—Carl E. Hall
*Attorney, Agent, or Firm*—Thompson Hine & Flory P.L.L.

[57] ABSTRACT

An apparatus for inserting connecting portions of an insulation sheet into slots of a stator core. A housing and a blade grip the insulation sheet by the slit in each of its connecting portions. The housing and the blade are then turned so that the blade engages a tooth of the stator core. The sheet is then bent by a deformation member such that the intermediate area of each body portion of the sheet is deformed and the opposite end areas of each body portion conform to the inside diameter portion of the stator core. Finally, the insulation sheet is moved into the core and the strips of each connecting portion are pushed into the predetermined slots.

9 Claims, 6 Drawing Sheets

APPARATUS FOR INSERTING INSULATION SHEETS INTO SLOTS OF A STATOR CORE

BACKGROUND OF THE INVENTION

This invention relates generally to an apparatus and method for inserting an insulation sheet into the slots of a stator core. More particularly, this invention relates to an apparatus and method for inserting an insulation sheet used for insulating multi-phase coils from each other, which coils are wound around a stator core of an electric rotary device such as an electric motor, into the slots of a stator core.

Generally, there are two methods of insulating stator coils. One of these methods is "slot insulation," in which insulation sheets are placed in the slots of the stator core. In this method the insulating sheet insulates the inside surface of the slots from the coil wires in the slots. In the second method, "phase insulation," insulation sheets are partially inserted into certain slots of the stator core to insulate the coil of a first phase from that of a second phase. A number of slot insulation devices have been developed. These devices automatically insert insulation sheets into the slots simultaneously with insertion of coil wires into the same slots. These devices are used effectively in automated wire-inserting processes.

In contrast, phase insulation has typically been carried out manually. Automation of the phase insulation process has proven difficult because the phase insulation process requires manipulating a very thin insulation sheet, having a pair of parallel strap portions interconnected by a pair of connecting portions, and, particularly, because it requires that the insulation sheet be bent into an arcuate shape. To compound the problem, the connecting portions must be inserted into two designated slots to achieve proper positioning of the sheet. Because this process is carried out manually, it requires a great deal of worker attention and results in a loss of worker productivity.

Japanese patent Kokoku No. 59-39982 describes a phase insulation device which can solve the previously described problem. This device is illustrated in FIGS. 8 and 9. In FIG. 8, an insulation sheet 101 is held in an upright position on a forming block 102 by a vacuum. The forming block 102 is moved in the direction of the arrow "Q", from the position shown in FIG. 8, and sandwiches the sheet 101 between itself and upper and lower blocks 103 and 104. This action corrugates the sheet 101. A center clamp 105 is lowered to temporarily secure the sheet 101 to the upper and lower blocks 103 and 104.

Meanwhile, a piston 106, as shown in FIG. 9, is activated to secure the opposite end portions of the sheet 101 to the positions between an upper side clamp 107 and the upper block 103 and between a lower side clamp 108 and the lower block 104. Subsequently, the forming block 102 is moved back to its initial position and the connecting portions 101a of the sheet 101 are placed into grooves 109a of pusher guides 109, respectively.

A stator 110 is positioned above the upper block 103 and the stator 110 is lowered after the slots 111 are aligned with the pusher guides 109, as shown in FIG. 9. Then, pistons 113 in a tooling 112, as shown in FIG. 8, are extended until the pusher guides 109 abut the inside surface of the stator 110. This causes the sheet 101 to become stationary while the connecting portions 101a are brought into alignment with the respective slots 111 of the stator 110. Next, the center clamp 102 and the upper and lower side clamps 107 and 108 are loosened to release the sheet 101. Once the sheet 101 is released, pistons 114 in the tooling 112 are extended and move pushers 115 through the pusher guides 109 toward the stator 110 to insert the connecting portions 101a into the respective slots 111 through the slot openings 111a. After this step, the sheet 101 expands due to its own resiliency to conform to the inside diameter portion of the stator 110 and the insertion process of the insulation sheet 101 is completed.

The previously described conventional insertion process is relatively uncomplicated because each of the connection portions 101a of the insulation sheet 101 consists of one leg or strip. However, the connecting portions 101a inserted by this conventional process tend to disengage from their respective slots when the strap portions of the sheet 101 are subject to an external force, such as a tensile force.

A new type of insulation sheet, which can be used to solve the above described problem, is available. The sheet is typically struck from an insulating sheet material. This new insulation sheet has a one-piece construction in which the connecting portions and the body portions are integrally formed with each other. The width of each connecting portion is greater than that of the opening of the associated slot. Each connecting portion is divided into two strips by a slit running lengthwise between the strips. Thus, the connecting portions have four total connection strips. These four connection strips are each inserted into separate slots of a stator core to inhibit accidental disengagement of the connection portions from the slots. However, automating the insertion process for this new sheet is also very difficult and no apparatus for carrying out such a process has previously been commercially available.

SUMMARY OF THE INVENTION

An object of the present invention therefore is to provide an apparatus which facilities insertion of the four connection strips of this new type of insulation sheet into the respective slots of a stator core and to also provide a method for automatically carrying out such a process.

According to one embodiment of the invention, a method of inserting a pair of connecting portions of a flexible insulation sheet into the slots of a stator core of an electric rotary device is described. The insulation sheet, as described above, has a unitary structure and includes a pair of body portions interconnected by the connecting portions. Each connecting portion has two sheet strips separated by a slit. According to the method, the insulation sheet is gripped by the slits. The sheet is then bowed such that an intermediate area of each body portion is formed in a "U" shape and the opposite end areas of each body portion conform to the inside diameter portion of the stator core. The strips of each connecting portion are aligned with preselected slots of the core and then the insulation sheet is moved into the stator core. After being moved into the stator core, the strips of each connecting portion are inserted into the selected slots.

The invention also describes an apparatus for carrying out the above described method. The apparatus has a simple structure and inserts the connecting portions into predetermined slots of a stator core without failure. The apparatus comprises a gripper, a deforming element, a positioning device and an inserter. The gripper grips the insulation sheet by the slits in the connecting portions. The deforming element bends the gripped insulation sheet such that the intermediate area of each body portion is bowed into an "U" shape and the opposite end areas of each body portion conform to the inside diameter portion of the stator core. The deforming element deforms the insulation sheet so that it is capable of entering into the inside diameter portion of the stator core and the strips of each connecting portion are aligned with selected slots in the stator. The positioning device moves the deformed insulation sheet in a direction parallel to the axis of the stator core to introduce the sheet into the stator core. The inserter then pushes the strips of the insulation sheet into the appropriate slots in the stator core.

In a preferred embodiment of the invention, the gripper includes a housing and a blade which sandwich the insulation sheet between themselves. This arrangement ensures that the two strips are properly positioned relative to the gripper. Preferably, the blade is dimensioned so that it can enter one of the slits of the sheet and engage the housing. Further, the blade can engage a tooth located between the selected slots of the stator core so as to be slidable in the direction of the central axis of the core. This slidable engagement allows proper positioning of the strips with respect to the slots and ensures insertion of the strips into the slots.

According to the method and apparatus of this invention, an insulation sheet is gripped by the slits of the connecting portions, bent such that the intermediate area of each body portion is deformed into an "U" shape and the opposite end areas conform to the inside diameter portion of the stator core, and positioned so that the two strips of each connecting portion align with selected slots of the stator core. When the sheet in this deformed condition is moved into the stator core, the two strips of each connecting portion are accurately positioned in front of the predetermined slots. Therefore, when pressed radially toward the core, the strips are inserted into the proper slots without failure.

DETAILED DESCRIPTION OF THE PREFERRED EMBODIMENT

Figure 7:
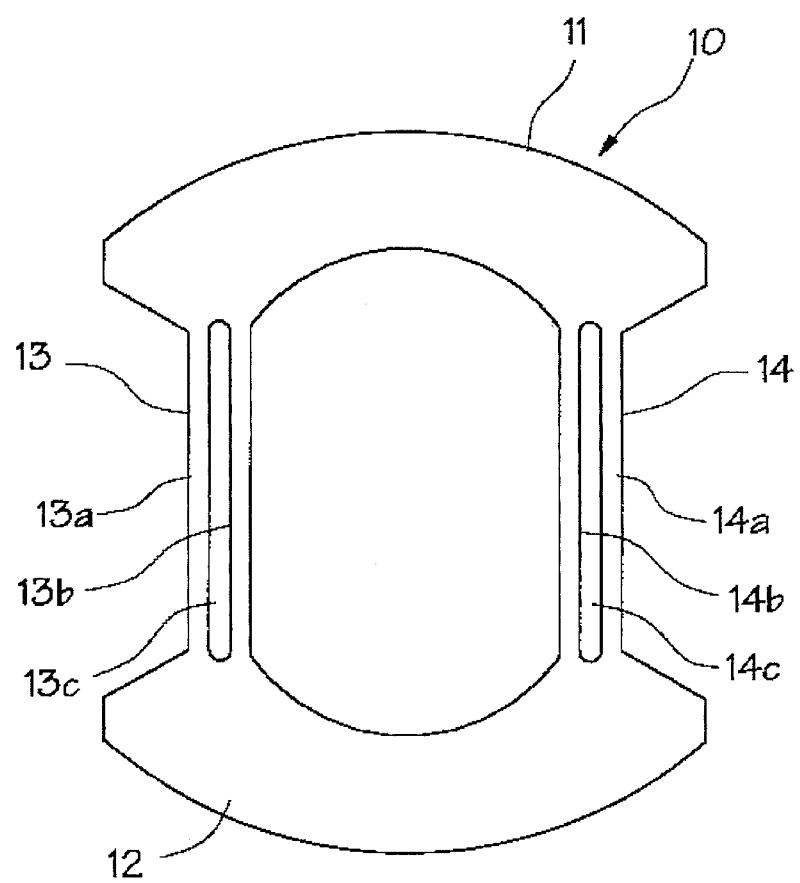
FIG. 7 is a view showing an insulation sheet used in the present invention.
Figure 8:
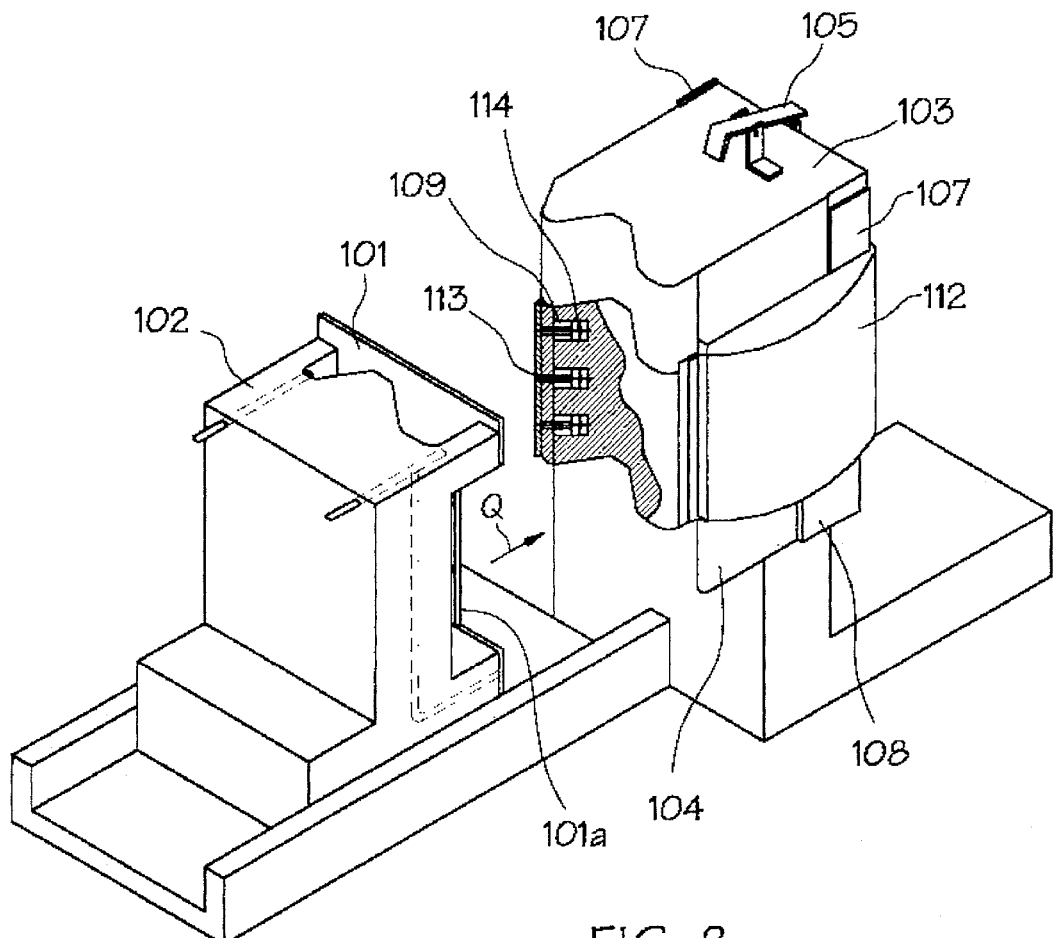
FIG. 8 is a perspective view of an example of conventional sheet-inserting apparatus.
Figure 9:
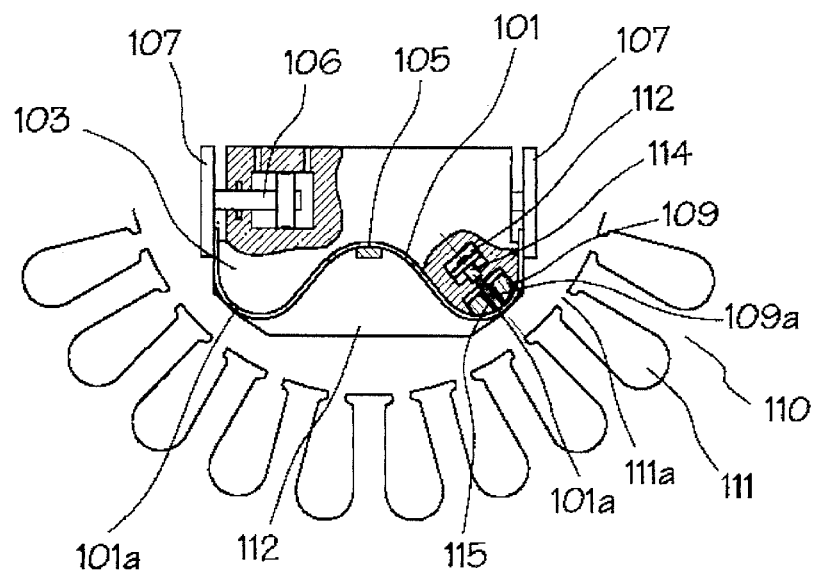
FIG. 9 is a schematic view illustrating another aspect of a conventional sheet insertion apparatus.

Referring now to the drawings, FIG. 7 illustrates the insulation sheet which this invention is designed to insert into a stator core. The insulation sheet 10 is struck from a thin flexible sheet of electrical insulating material such as polyester, nylon or the like, and has a unitary construction. As shown in FIG. 7, the sheet 10 includes arcuate body portions 11 and 12 and linear connecting portions 13 and 14 which connect the body portions 11 and 12 together at their opposite ends. The width of the body portions 11 and 12 is greater than that of the connecting portions 13 and 14. The connecting portion 3 comprises a pair of spaced parallel strips 13a and 13b separated by a slit 13c. Likewise, the connecting portion 14 comprises a pair of spaced parallel strips 14a and 14b also separated by a slit 14c.

An apparatus for inserting insulation sheets according to the present invention comprises a magazine 1 including a stack of insulation sheets 10; a sheet dispensing unit 2 for picking up by suction the insulation sheets 10 consecutively out of the magazine 1; and a sheet transfer unit having a pair of sheet grippers 3 depending therefrom for receiving and holding the sheets from the dispensing unit 2. The grippers 3, when receiving a sheet 10, move to a position above a stator core 7 and then move downward to place the sheet 10 on the inside of the stator core 7. During operation of the apparatus, the stator core 7 is fixed on a pallet with its central axis disposed vertically. In the same manner as the grippers, a sheet deformation member 4 depends from the sheet transfer unit to bend the insulation sheet 10, held by the grippers 3, into a predetermined shape. The apparatus further includes a member for inserting connecting portions 13 and 14 into the slots of a stator core 7.

Figure 2:
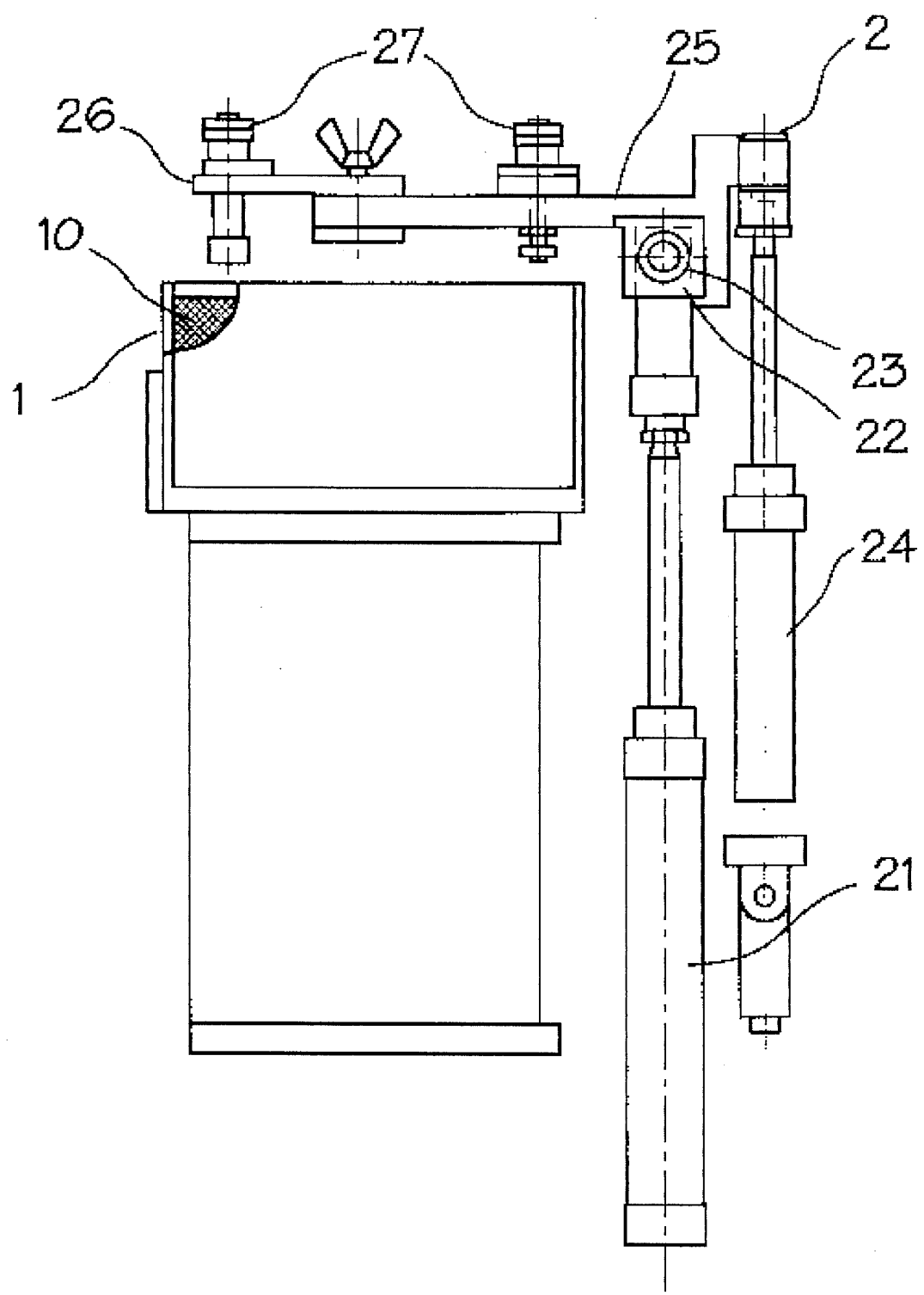
FIG. 2 is a side view of a device for feeding insulation sheets used in the invention.

The sheet dispensing unit 2 consecutively removes the stacked insulation sheets 10 from the magazine 1. As shown in FIG. 2, the dispensing unit 2 comprises a unit body 22, a drive cynlinder 21 for moving the body 22 vertically, a first pick-up arm 25 pivotally connected to a shaft 23 of the unit body 22 to be pivotally movable about the shaft 23, a drive cylinder 24 for pivoting the arm 25, a second pickup arm 26 mounted on the first arm 25 for movement along the length of the arm 25, and suction nozzles 27 mounted respectively on the first pick-up arm 25 and the second arm 6. The second arm 26 is provided to adjust the positioning between the nozzles 27.

Figure 3:
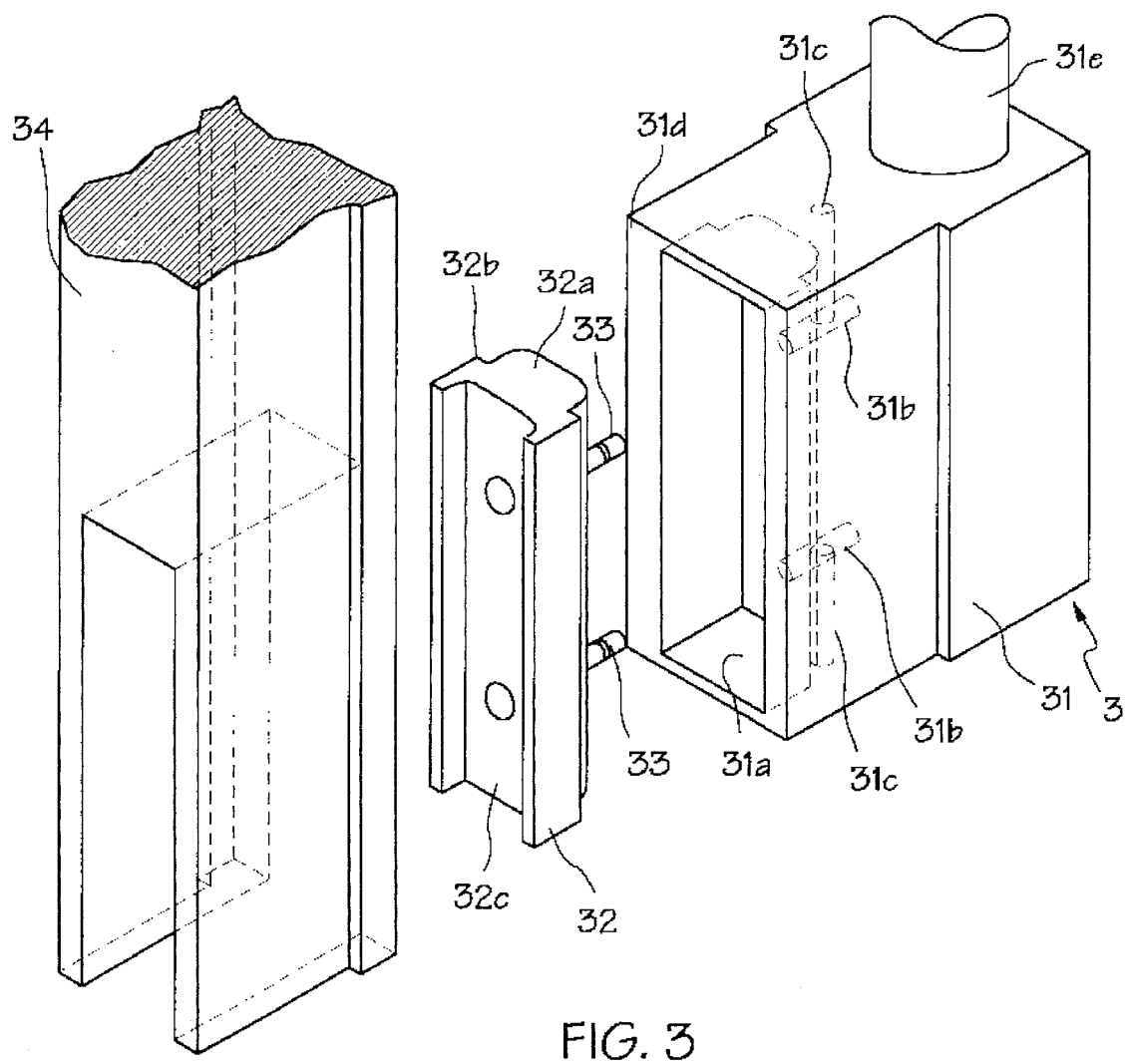
FIG. 3 is a perspective view of a gripper in FIG.
Figure 4:
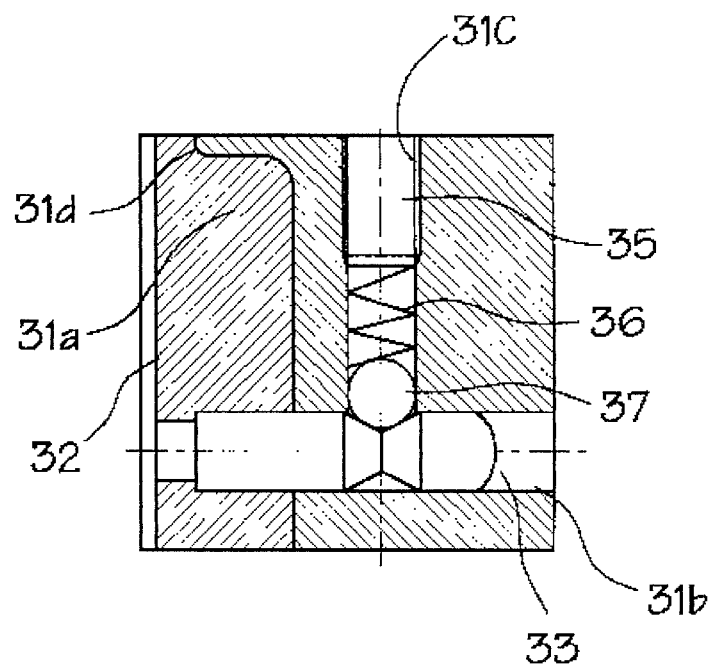
FIG. 4 is an enlarged cross-sectional view showing a housing and a blade in a mutually engaged condition.

As best shown in FIG. 3, each gripper 3 comprises a housing 31 and a blade 32. The housing 31 is mounted on a unitary shaft 31e and includes an elongated recess 31a extending along its length. The recess 31a has a length and a width generally equal to those of the slits 13c and 14c in the connecting portions 13 and 14, as shown in FIG. 7. A pair of engaging apertures 31b are formed in the housing 31 at the base of the recess 31a. The engaging apertures 31b are disposed perpendicularly to the recess 31a. Threaded apertures 31c, each having a first end and a second end, are additionally formed in the housing 31. Threaded apertures 31c connect at their first ends with the engaging apertures 31b and their second ends open to the top and bottom ends of the housing 31, respectively. As seen in FIG. 4, each aperture 31c includes a ball 37, therein, which is biased toward aperture 31b by means of a spring 36. Spring 36 and ball 37 are maintained in position in threaded aperture 31c by a setscrew 35 which is threadedly engaged in aperture 31c.

Figure 1:
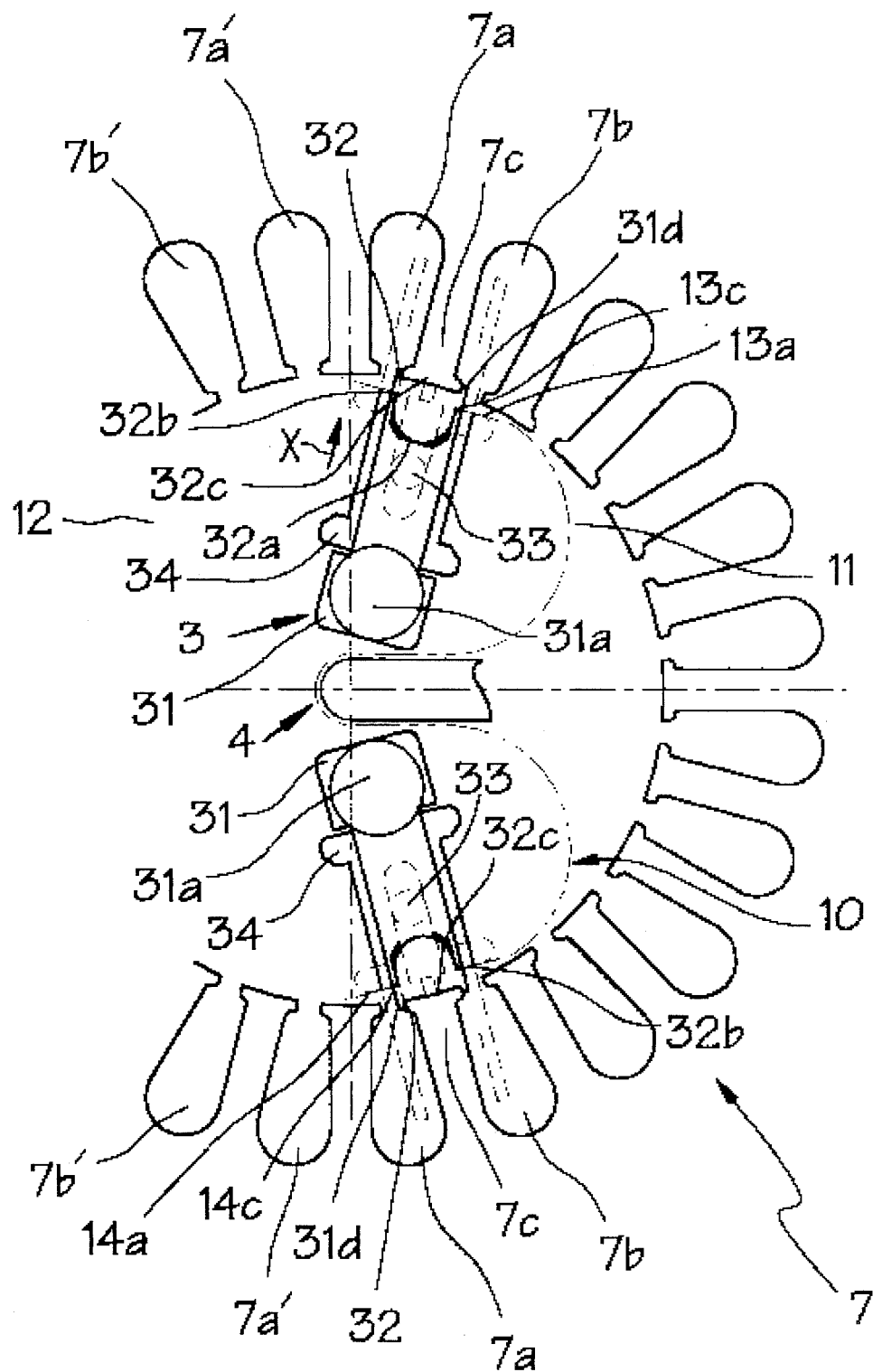
FIG. 1 is a schematic overhead view illustrating an embodiment of the present invention.

The blade 32 has a semicylindrical projection 32a that is dimensioned to engage the recess 31a of housing 31. The projection 32a includes, at its semicylindrical surface, pins 33 complimentary in shape to the engaging apertures 31b. Pins 33 each have a tapered surface near their ends. The projection 32a is adjoined by a pair of shoulders 32b, and a groove 32c is formed in the blade 32 at the side opposite the projection 32a. The groove 32c is slidably engageable with any one tooth 7c of the stator 7 (see FIG. 1) and can therefore guide the insulation sheets 10 into the the stator core 7.

As shown in FIG. 3, an inserter 34 has a body 34a and two arms 34b. The arms 34b are slidably situated on the side faces of the housing 31 so as to be movable with respect to the blade 32 and housing 31 in a direction perpendicular to the length of the housing 31. The inserter 4 moves the connecting portions into the desired slots of the core 7. The housing 31, the blade 32 and the inserter 34 are all movably connected at their respective upper portions to a transfer unit (not shown) to depend therefrom and reciprocate between the sheet dispensing unit 2 and the stator core 7.

Along with the members described above, deforming element 4, as seen in FIG. 6, also depends from the transfer unit. The deforming element 4 has a curved surface 4a, which preferably has a "U" shape. The deforming element 4 in cooperation with the grippers 3 bends the insulation sheet 10 from a flat condition into a predetermined form. In short, the deforming element 4 and the grippers 3 constitute a means for deforming the insulation sheets 10.

The operation of the apparatus will now be described. The magazine 1 contains a number of insulation sheets 10 which are stacked horizontally, as seen in FIG. 2. Once the inserting apparatus is activated, sheet insertion is automatically implemented.

First, the first pick-up arm 25 of the dispensing unit 2 is pivoted 90° from a vertical position to a horizontal position. The unit body 22 is lowered toward the magazine 1 with the first pick-up arm 25 in a horizontal position, as shown in FIG. 2, and then the suction nozzles 7 are activated to pick up the uppermost sheet 10 in the magazine 1. The suction nozzles 27 (e.g., four nozzles) on the first and second pick-up arms, 25 and 26, grasp the body portions 11 and 12 of the top sheet 10 in the magazine 1. The suction nozzles 27 grasp the insulation sheet 10 by means of a vacuum generated by a conventional vacuum generating device (not shown). After the nozzles 27 grasp the top sheet 10, the first pick-up arm 25 is pivoted to a vertical position and then the unit body 22 is lifted to a predetermined position at which the sheet 10 is transferred to the grippers 3.

Figure 5:
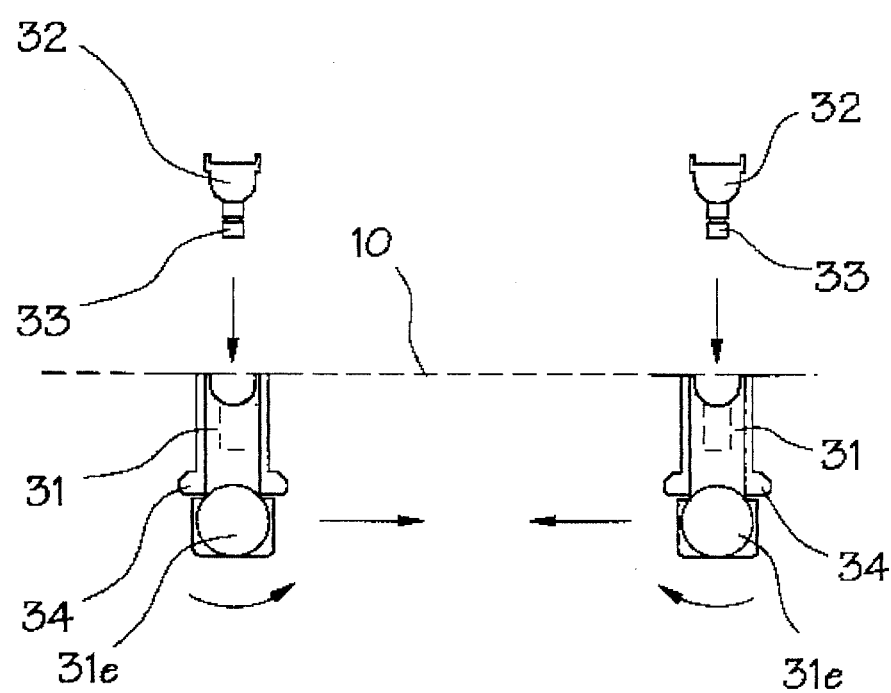
FIG. 5 is a view illustrating a sheet-gripping step.

After picking up the top sheet 10, the first pickup arm 25 pivots 90° back to a vertical position as the unit body 22 is moved upwardly. Then, the transfer unit, which has been on standby at the position above the dispensing unit 2, is lowered together with the grippers 3 to a receiving position at which, as shown in FIG. 5, the leading ends of the housings 31 are brought into flat face contact with the sheet 10 while the recesses 31a of the housings 31 are aligned with the slits 13c and 14c of the connecting portions 13 and 14, respectively. The blades 32 are also aligned with the slits 13c and 14c of the sheet 10 while the transfer unit is in the receiving position.

After the blades 32 are aligned with the housings 31 on each side of the insulation sheet 10, as shown in FIG. 5, the blades 32 are moved toward the housings 31 until the projections 32a are received in the recesses 31a of the housings 31 through the slits 13c and 14c. When blade 32 engages the housing 31, the pins 33 are received in the engaging holes 31b. As seen in FIG. 4, the pin 33 contacts, at the tapered surface near its end, ball 37 which is biased by spring 36. The pin 33 in this condition is subject to the biasing force of the spring 36 and is urged toward the housing 31. By this means, the connecting portions 13 and 4 of the insulation sheet 10 are gripped by the slits 13c and 14c by the leading ends 31d of the housings 31 and the shoulders 32b of the blades 32. The connecting portions 13 and 14 are securely held by the grippers 3 even after the blade-driving means is deactivated. After the insulation sheet 10 has been gripped by the grippers 3, the suction nozzles 27 are deactivated.

After the grippers 3 grasp the sheet 10, the transfer unit is moved upwardly and then sideways to a position above the stator core 7. At this position, the grippers 3 are moved toward each other and turned about the unitary shafts 31e to the position shown in FIG. 6. As the grippers 3 are being moved, the sheet 10 engages the curved surface 4a of the deforming element 4 and the deforming element 4 bends the respective intermediate areas of the body portions 11 and 12 into a "U" shape.

Figure 6:
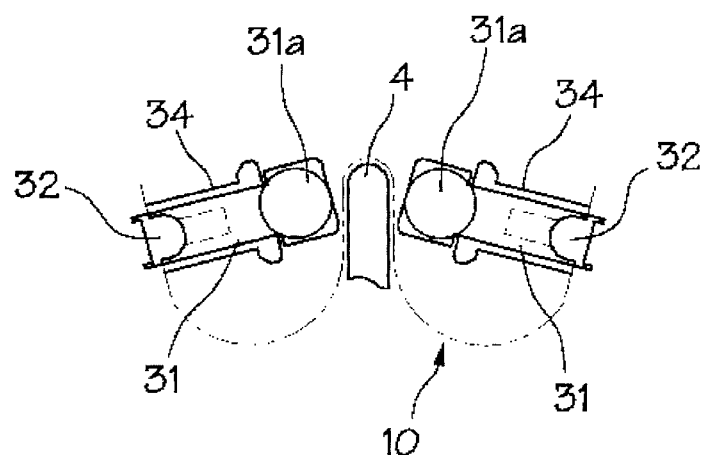
FIG. 6 is a view illustrating the deformer employed in this apparatus.

When in the position shown in FIG. 6, the grooves 32c of the blades 32 align with the teeth 7c formed between the selected slots 7a. As the transfer unit is lowered in the direction parallel to the cylindrical axis of the stator core 7 from the position shown on FIG. 6, the grooves 32c of the blades 32 engage the teeth 7c and the grippers 3 and the sheet 10 are guided into the core 7.

After the grippers 3 are guided into the core 7, the inserters 34 are moved in the direction of the arrow "X" in FIG. 2 while the housings 31 remain stationary As the arms 34b move forward, they engage the respective connecting portions, 13 or 14, and remove the connecting portion from the gripper 3. The arms 34b continue moving forward to push the connecting portions into the appropriate slots in the stator core 7. The connecting portions 13 and 14 of the sheet 10 are pushed against resistance of the grippers 3, and, as a result, the strips 13a, 13b, 14a and 14b are inserted respectively into the selected slots 7a and 7b. After the strips have been inserted into their respective slots, the grippers 3 and the deformation member 4 are removed from the core 7. The removal of the grippers 3 and the deformation means 4 allows the body portions 11 and 12 of the sheet 10 to expand due to the inherent resiliency of the sheet 10 so that the body portions 11 and 12 are disposed generally along the inside diameter position of the stator core 7.

After completion of the insertion of a first insulation sheet 10 into the stator core 7, the stator core 7 is rotated 180° about its cylindrical axis, and the above described process is repeated to insert the connecting portions 13 and 14 of a second insulation sheet 10 into a set of preselected slots 7a' and 7b'. The sheet-inserting process for the stator core 7 is completed after the second sheet is inserted.

According to the invention as described above, a pair of connecting portions of an insulation sheet, each having a pair of strips, are held by the slits which separate the strips. The body portions of the sheet are then deformed such that the respective intermediate areas of the body portions are formed into a "U" shape and the opposite end areas of the body portions conform to the inside diameter portion of the stator core. The insulation sheet is moved along the vertical axis of the core into the inside of the core while the strips of each connecting portion of the sheet are aligned with preselected slots, and then the strips are inserted into the slots. The previously described method ensures correct positioning of the connecting portions with respect to the associated slots. Because the connecting portions are flexible, this method facilitates insertion of insulation sheets into the slots of a stator core. The two pairs of strips of the insulation sheets are inserted into four slots, each independently engaging a respective slot. This arrangement inhibits accidental disengagement of the connection portion from its respective slot even if external force is applied to the body portions after the insertion process.

In a preferred embodiment, the housing and blade grip the connecting portions of each sheet by the slits. This simple arrangement permits correct positioning of the connecting portions which each have two flexible strips.

In a further embodiment of the invention, the blades can slidably engage the teeth of the core between the selected slots, so that the blades are movable along the axis of the core. Thus, the strips of the connecting portions are correctly positioned in front of the preselected slots when the sheet is introduced into the core. As a result, the strips are inserted into the proper slots without failure.

Having described the invention in detail and by reference to preferred embodiments thereof, it will be apparent that modifications and variations are possible without departing from the scope of the invention defined in the appended claims.

What is claimed is:

1. An apparatus for inserting a pair of connecting portions of an insulation sheet into slots formed in a stator core of an electric rotary device, the insulation sheet having a one-piece construction including a pair of body portions interconnected by the connecting portions, each of the connecting portions having two sheet strips separated by a slit, the apparatus comprising:

a pair of grippers which grip the insulation sheet by the slits;

a deforming element which deforms the insulation sheet such that the insulation sheet is deformed into a shape which conforms to the inside diameter of the stator core;

a positioning device which moves the insulation sheet in a direction parallel to an axis of the stator to a position inside the stator core; and an inserter which slidably engages each gripper and inserts the strips of each connecting portion into slots in the stator core.

2. The apparatus of claim 1 wherein the deforming element deforms the insulation sheet into a "U" shape.

3. The apparatus of claim 2 wherein the grippers align the strips of the connecting portions with slots in the stator core into which the strips are inserted.

4. The apparatus of claim 1 further including a sheet dispensing unit which removes the insulation sheets from a magazine containing insulation sheets stacked horizontally and transfers the sheets to the gripper.

5. The apparatus of claim 4 wherein the dispensing unit comprises:

a body having a shaft connected thereto;

a first drive cylinder for moving the unit vertically;

a first pick-up arm pivotally connected to the shaft, the pick-up arm being movable about the shaft;

a second drive cylinder for pivoting the first pick-up arm;

a second pick-up arm adjustably mounted on the first pick-up arm to move along the length of the first pick-up arm; and suction nozzles mounted on the first pick-up arm and the second pick-up arm;

wherein the body is lowered toward the magazine with the first pick-up arm in a horizontal position, the suction nozzles are activated to grasp the sheet, and the first pick-up arm is pivoted to a vertical position at which the sheet is transferred to the grippers.

6. The apparatus of claim 1 wherein each gripper includes a housing having an elongated recess extending along its length and a blade having a semi-cylindrical projection which engages the recess, wherein the semi-cylindrical projection of the blade engages both a slit in the insulation sheet and a recess in the housing to grip the insulation sheet.

7. The apparatus of claim. 6 wherein the recess further includes a bottom having a pair of engaging apertures therein, the .apertures being disposed perpendicularly to the recess and the blade further includes a plurality of pins located on the projection which engage the engaging apertures and a groove on the side of the blade opposite the projection, the groove being capable of engaging a tooth of the stator core, wherein the pins engage the engaging holes to retain the insulation sheet when the semi-cylindrical projection engages the recess and the groove engages the tooth of the stator core to guide the insulation sheet into the inside of the stator core.

8. The apparatus of claim 7 wherein the housing further includes a second set of apertures having a first end and a second end, the second set of apertures connected perpendicularly at their first ends to the engaging apertures and having their second ends open at the top and bottom ends of the housing, wherein the apertures contain a ball at their first end, the ball being biased by a spring which is located at a lower end of a setscrew threaded in each aperture and the ball engaging the pins on the blade to secure the pins in position in the housing.

9. The apparatus of claim 6 wherein the inserter comprises a body having two arms which slidably engage the housing to be movable in a direction perpendicular to the length of the housing so that when the arms engage the gripped insulation sheet, the sheet is removed from the grippers and inserted into the stator slot.

* * * * *

UNITED STATES PATENT AND TRADEMARK OFFICE
CERTIFICATE OF CORRECTION

PATENT NO.    :  5,542,170
DATED         :  August 6, 1996
INVENTOR(S)   :  Masatoshi Hirano It is certified that error appears in the above-indentified patent and that said Letters Patent is hereby corrected as shown below:

Claim 7, col. 8, line 18, delete "." after "claim".

Claim 7, col. 8, line 20, delete "." before "aperatures".

Signed and Sealed this

Twelfth Day of November, 1996

Attest:

BRUCE LEHMAN

*Attesting Officer*       *Commissioner of Patents and Trademarks*